J. G. CONGER & B. R. QUINT.
ATTACHMENT FOR BINDERS.
APPLICATION FILED JAN. 27, 1913.
1,090,029.
Patented Mar. 10, 1914.
3 SHEETS—SHEET 1.
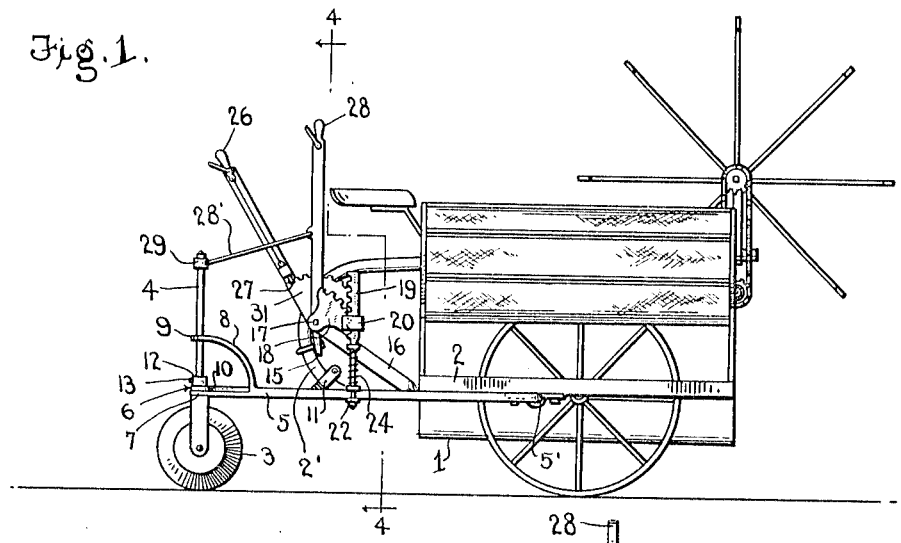
Fig. 1.
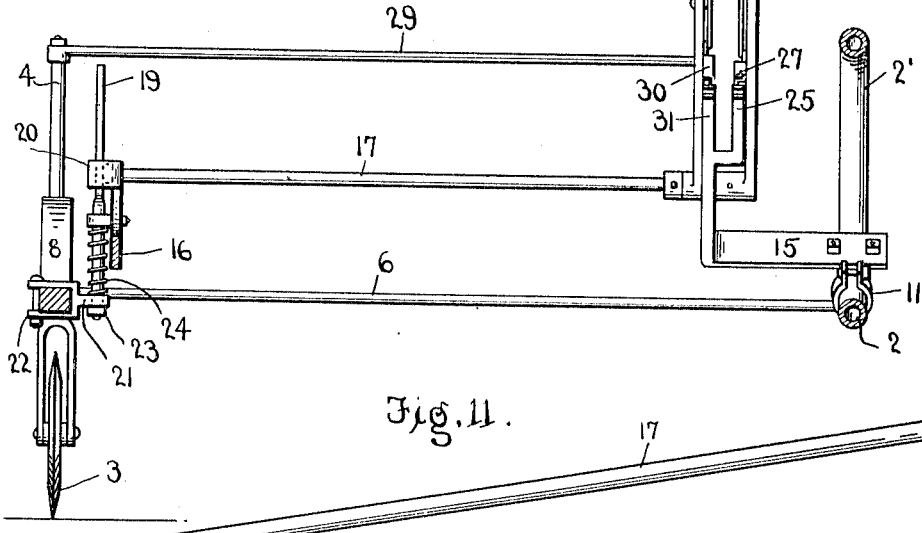
Fig. 4.
Fig. 11.
Witnesses
L. B. James
C. E. Hunt
Inventors
John G. Conger &
Bonner R. Quint
By H. B. Willson & Co.
Attorneys J. G. CONGER & B. R. QUINT.
ATTACHMENT FOR BINDERS.
APPLICATION FILED JAN. 27, 1913.
1,090,029.
Patented Mar. 10, 1914.
3 SHEETS—SHEET 2.
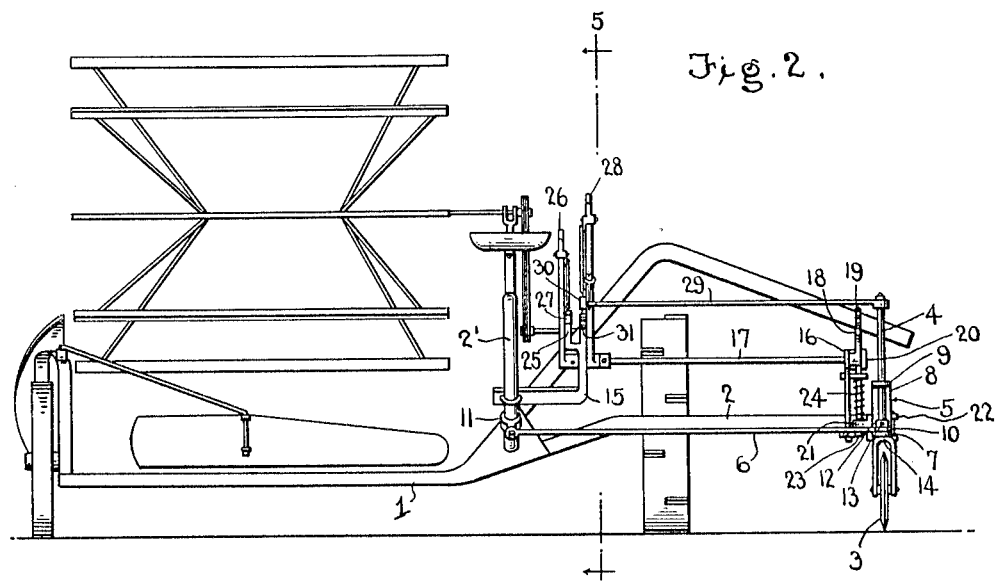
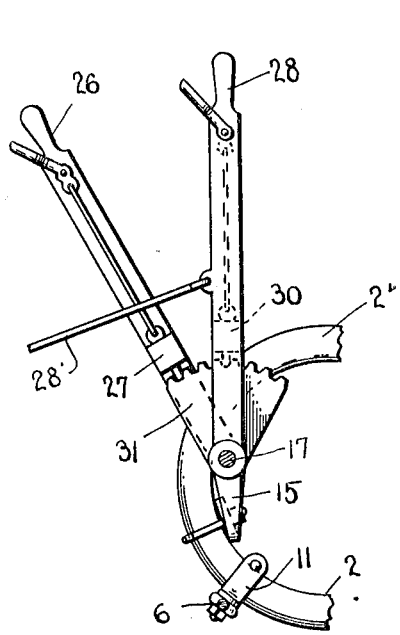
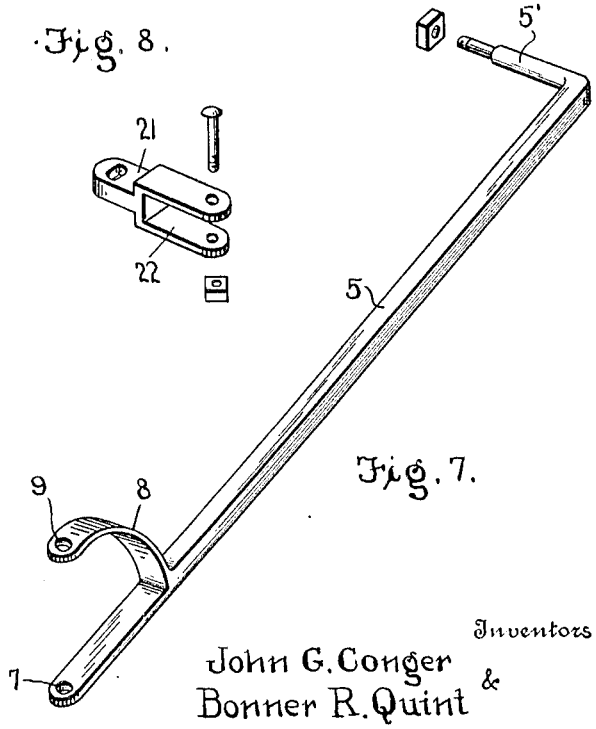
Witnesses
L. B. James
C. E. Hunt
Inventors
John G. Conger
&
Bonner R. Quint
By H. B. Willson &Co
Attorneys J. G. CONGER & B. R. QUINT.
ATTACHMENT FOR BINDERS.
APPLICATION FILED JAN. 27, 1913.
1,090,029.
Patented Mar. 10, 1914.
3 SHEETS—SHEET 3.
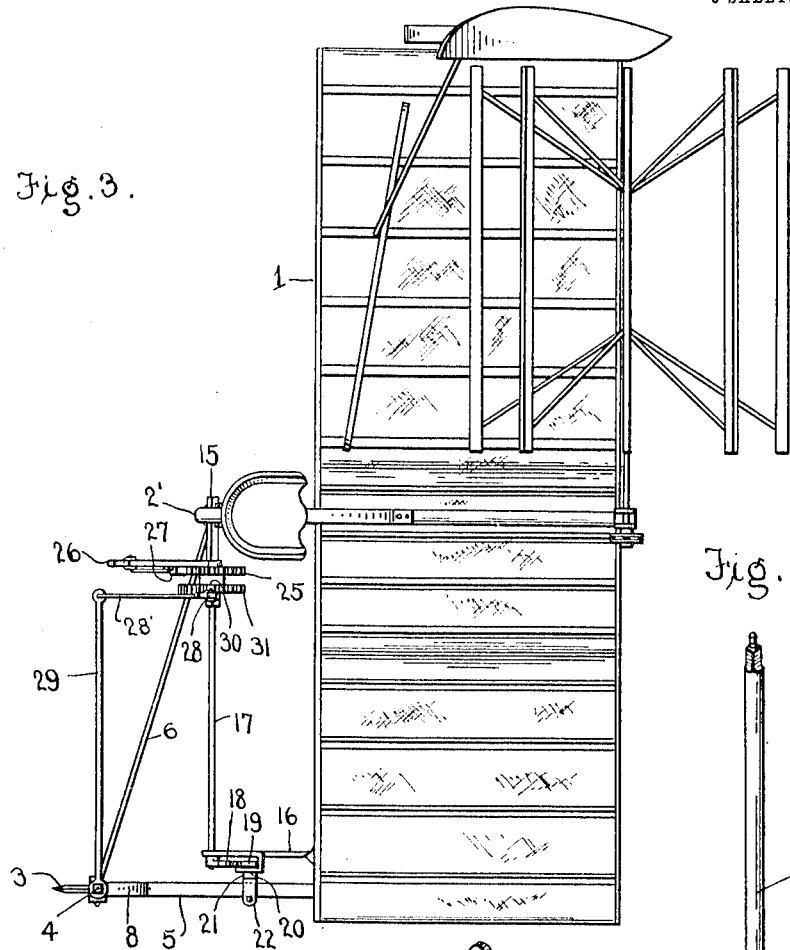
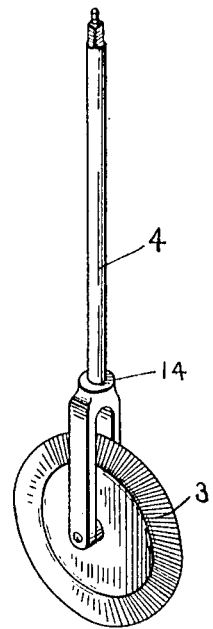
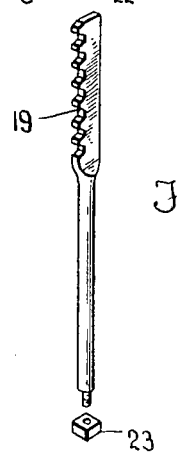
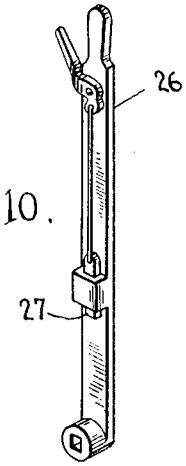
Witnesses
L. B. James
C. E. Hunt
Inventors
John G. Conger &
Bonner R. Quint
By H. R. Willson &Co
Attorneys

UNITED STATES PATENT OFFICE.

JOHN G. CONGER AND BONNER R. QUINT, OF FARMINGTON, WASHINGTON.

ATTACHMENT FOR BINDERS.

1,090,029.  Specification of Letters Patent.  Patented Mar. 10, 1914.

Application filed January 27, 1913. Serial No. 744,561.

*To all whom it may concern:*

Be it known that we, JOHN G. CONGER and BONNER R. QUINT, citizens of the United States, residing at Farmington, in the county of Whitman and State of Washington, have invented certain new and useful Improvements in Attachments for Binders; and we do declare the following to be a full, clear, and exact description of the invention, such as will enable others skilled in the art to which it appertains to make and use the same.

This invention is an attachment for binders and other wheeled agricultural machines.

One object of the invention is to provide an attachment adapted to be applied to machines of this kind drawn by draft animals or other power to prevent the machine from tilting over, sliding, or sluing when working on a hillside or uneven ground.

Another object is to provide an attachment of this character having means whereby the same may be adjusted to different elevations, and also means to turn the same to different angles to steer the binder.

A further object is to provide means for yieldingly holding the attachment thereby preventing the same from being broken or injured by shocks or jolts occasioned by the passage of the binder over ruts or uneven ground.

With these and other objects in view, the invention consists of certain novel features of construction, and the combination and arrangement of parts as will be more fully described and claimed.

In the accompanying drawings; Figure 1 is a side view of a portion of a binder showing the attachment applied thereto. Fig. 2 is a rear view thereof. Fig. 3 is a plan view of the same. Fig. 4 is a vertical section taken on the line 4—4 of Fig. 1. Fig 5 is a similar view taken on the line 5—5 of Fig. 2. Fig. 6 is a detail perspective view of the ground wheel and standard of the attachment. Fig. 7 is a similar view of the side supporting bar of the attachment. Fig. 8 is a similar view of the combined clamp and guide lug for the adjusting mechanism of the attachment. Fig. 9 is a similar view of the rack bar of the adjusting mechanism. Fig. 10 is a perspective view of the lever for actuating the adjusting mechanism. Fig. 11 is a similar view of the rock shaft of the adjusting mechanism and which is actuated by the lever shown in Fig. 10.

Referring more particularly to the drawings, 1 denotes the platform of the machine (here a binder) to which the attachment is applied, and 2 denotes a portion of the fixed frame work of the machine.

Our improved attachment comprises a ground wheel or disk 3 which is revolubly mounted in the forked or bifurcated lower end of a supporting standard 4. The standard 4 and the disk 3 will be arranged at the rear corner of the delivery side of a binder and said standard is loosely mounted to turn in a side supporting bar 5 and a rear supporting bar 6 which stands at an angle to the side supporting bar as shown. The side supporting bar 5 extends forwardly along the line of draft and parallel with the delivery side of the machine and has its forward end 5' bent inwardly at right angles and pivotally or hingedly secured in any suitable manner to a fixed part of the frame work of the machine as shown in Fig. 1, while its body underlies said framework. In the rear or outer end of the side supporting bar 5 is an upright bearing in which the standard 4 of the disk 3 is loosely journaled and secured to said side supporting bar near its rear end is an upwardly projecting inclined brace 8 the upper end of which is bent at an angle and has therein an upright bearing 9 in which the standard 4 is also loosely journaled.

The rear supporting bar 6 has in its outer end an upright bearing 10 in which the standard 4 is journaled immediately above the bearing in the side supporting bar as shown. The inner end of the rear supporting bar 6 is pivotally connected to a clamp or clip 11, see Fig. 5, which is secured to the upbent rear end 2' of the frame work 2 of the machine as shown. Adjustably secured to the standard 4 above the bearing 10 in the outer end of the rear supporting bar 6 is a collar 12 said collar being preferably adjustably secured to the standard by a set screw 13. The forked or bifurcated lower end of the standard 4 is somewhat larger than the standard and forms at its upper end a shoulder 14 between which and the collar 12 the bearings at the outer ends of the side and rear supporting bars 5 and 6 are mounted on the standard. By thus connecting the side and rear supporting bars with the standard, it will be seen that when said bars are swung upwardly and downwardly in a manner hereinafter described, the standard 4 and disk 3 will be raised or lowered relative to the framework 2 and at the same time the standard will be free to turn axially in the bearings at the ends of said supporting bars, thus permitting the disk to be adjusted to various angles in a manner which will be hereinafter described.

Revolubly mounted at its inner end in a bearing bracket 15 on the frame of the machine, and at its outer end in a bearing plate 16 secured to a suitable part of the frame or platform of the machine, is a rock shaft 17. Fixed on the outer end of the shaft 17 is a segmental gear 18 which has an operative engagement with a rack bar 19 slidably supported in a suitable guide 20 connected with the frame of the machine. The bar 19 has its lower portion reduced and in slidable engagement with an apertured lug 21 on a clamp 22 secured to the adjacent portion of the side supporting bar 5 as shown. The lower end of the rack bar 19 is threaded to receive a nut 23 which stands beneath the lug 21 so that when the rack bar 19 is raised the nut strikes the lug and raises the clamp, which in turn raises the side supporting bar 5 relatively to the main framework 2 so that the latter will be let down and the machine tilted backward over the axle of its wheels until the main framework 2 strikes the side supporting bar 5 as seen in Fig. 1. On the other hand, when the rack bar 19 is depressed by turning the segmental gear 18 in the opposite direction the guide bar 5 is pushed downward with respect to the main framework 2 so that while the wheel 3 rests on the ground the main framework in effect is tilted forward over the axle of its supporting wheels. On the reduced portion of the rack bar 19 is coiled a spring 24 the lower end of which engages the lug 21 on the clamp 22 and yieldingly forces the bar 5 and the standard 4 downwardly thereby yieldingly holding the disk 3 in engagement with the ground so that when said disk passes over ruts or obstructions, the disk and its supporting mechanism will give or yield upwardly against the pressure of the spring 24 thus preventing the breaking or injuring of any of the parts.

Carried by the bearing bracket 15 which revolubly supports the inner end of the rock shaft 17 is a segmental rack 25. Fixedly secured to the end of the shaft 17 adjacent to one side of the bracket 15 and rack 25 is a shaft operating lever 26 having a spring projected pawl 27 which is adapted to engage the teeth of the segmental rack 25 and to lock the lever 26 in its adjusted positions and after the same has been shifted to rock the shaft 17 and thereby actuate segmental gear and rack connections between said shaft and the disk supporting mechanism to adjust the standard 4 and disk 3 in the manner described. Loosely mounted on the inner end of the rock shaft 17 is a second lever 28 which is operatively connected by a link 28' to a crank arm 29 having its outer end fixedly engaged with the upper end of the standard 4 whereby when the lever 28 is swung forwardly or rearwardly said standard 4 will be turned axially in one direction or the other in the bearings of the supporting bars 5 and 6 and brace 8 thereby adjusting the disk 3 to the desired angle so as to steer the binder slightly to one side as is sometimes desirable. The lever 28 is provided with a spring projected pawl 30 which is adapted to engage the teeth of a segmental rack 31 also carried by the bracket 15 and to thereby lock the lever 28 for holding the standard 4 and disk 3 in the positions to which they have been adjusted by said lever.

By means of an attachment constructed as herein shown and described, it will be seen that when the attachment is properly adjusted the binder will be supported and held against tilting or slipping when working on hillsides or uneven ground. It will also be noted that the attachment may be readily adjusted to accommodate the same to the grade or uneven surface of the ground over which the binder is working. The cushion spring 24 permits the sudden rise of the ground wheel in case it passes over an obstruction, but ordinarily the vertical position of this wheel and of all the parts that carry it is controlled by setting the lever 26 as described above. When the ground wheel is raised, the rear side of the binder or other machine is permitted to descend a little or tip to the rear, and on the other hand when the ground wheel is lowered the entire machine is tipped forward a little as will be clear. The adjustment of the other lever, through the link 28' and crank arm 29, sets the standard around its own axis and therefore adjusts the ground wheel to a predetermined angle with respect to the line of draft. This adjustment is useful to steer the machine slightly (or considerably if the lever is adjusted sufficiently), and will be found useful especially on hillsides where the machine has a tendency to drift or "creep" to either side of the proper and desired line of draft.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described our invention, what we claim is:—

1. An attachment for binders comprising a side supporting bar having its front end turned inward and adapted to be hingedly mounted beneath the framework of the machine and its rear end provided with an upright bearing, a brace rising from said bar and bent to the rear and provided with a bearing above that in the bar, a rear supporting bar having its inner end adapted to be connected with the main framework and its outer end provided with a bearing standing between those just mentioned, an upright standard rotatably mounted in the three bearings and having its lower end forked, a ground wheel mounted within the fork, a collar adjustably mounted on the standard above the bearing at the rear end of said rear supporting bar, means for turning the standard axially within its bearings, and means for raising and lowering the rear end of said bar and the standard with respect to the main framework of the machine.

2. An attachment for binders comprising a side supporting bar having its front end turned inward and adapted to be hingedly mounted beneath the framework of the machine and its rear end provided with an upright bearing, a brace rising from said bar and bent to the rear and provided with a bearing above that in the bar, a rear supporting bar having its inner end adapted to be connected with the main framework and its outer end provided with a bearing standing between those just mentioned, an upright standard rotatably mounted in the three bearings and having its lower end forked, a ground wheel mounted within the fork, a collar adjustably mounted on the standard above the bearing at the rear end of said supporting bar, means for turning the standard axially within its bearings, a clamp mounted on said side supporting bar and having an apertured lug, a rack bar whose lower portion is reduced and passes loosely through the aperture in said lug, a nut on the lower end of said rack bar beneath the lug, an expansive spring coiled on the reduced portion of said rack bar between the enlarged portion thereof and said lug, and means for raising and lowering the rack bar.

3. An attachment for binders comprising a side supporting bar having its forward portion hingedly connected with the framework and an upright bearing at its rear end, a brace rising from said bar and bent to the rear and provided with a bearing above that in the bar, a rear supporting bar having its forward end hingedly connected with the framework and an upright bearing at its rear end, an upright standard rotatably mounted in the three bearings and having its lower end forked, a ground wheel mounted within the fork, means for turning the standard in its bearings, a clamp mounted on said side supporting bar and having an apertured lug, a rack bar whose lower portion is reduced and passes loosely through the aperture in said lug, a nut on the lower end of said rack bar beneath the lug, an expansive spring coiled on the reduced portion of said rack bar between the enlarged portion thereof and said lug, and means for raising and lowering the rack bar.

4. An attachment for binders comprising a side supporting bar having its forward portion hingedly connected with the framework and an upright bearing at its rear end, a rear supporting bar having its forward end hingedly connected with the framework and an upright bearing at its rear end, an upright standard rotatably mounted in the bearings and having its lower end forked, a ground wheel mounted within the fork, a rack bar whose lower portion is yieldingly connected with said side supporting bar, a bearing carried by the main frame of the machine and supporting a pair of toothed segments, a rock shaft journaled in said bearing and carrying an operating lever having a thumb latch coacting with one of said segments, a segmental gear on this shaft engaging said rack bar, a second operating lever loosely mounted on said rock shaft and having a thumb latch coacting with the other toothed segment, a crank arm fixed to the upper end of said standard, and connections between this crank arm and the second operating lever.

5. An attachment for binders comprising a side supporting bar having its forward portion hingedly connected with the framework and an upright bearing at its rear end, a brace rising from said bar and bent to the rear and provided with a bearing above that in the bar, a rear supporting bar having its forward end hingedly connected with the framework and an upright bearing at its rear end, an upright standard rotatably mounted in the three bearings and having its lower end forked, a ground wheel mounted within the fork, a clamp mounted on said side supporting bar and having an apertured lug, a rack bar whose lower portion is reduced and passes loosely through the aperture in said lug, a nut on the lower end of said rack bar beneath the lug, an expansive spring coiled on the reduced portion of said rack bar between the enlarged portion thereof and said lug, a rock shaft journaled on the main frame of the machine and carrying an operating lever, a segmental gear on this shaft engaging said rack bar, a second operating lever loosely mounted on said rock shaft, a crank arm fixed to the upper end of said standard, and connections between this crank arm and the second operating lever.

In testimony whereof we have hereunto set our hands in presence of two subscribing witnesses.

JOHN G. CONGER.
BONNER R. QUINT.

Witnesses:
HARVY ENGLE,
LEE CULP.